US005987714A

United States Patent [19]

Smith

[11] Patent Number: 5,987,714

[45] Date of Patent: Nov. 23, 1999

[54] SPRING FASTENER OF HIGH SEALING PERFORMANCE

[76] Inventor: Edward John Smith, 260 Lely Beach, #301, Bonita Springs, Fla. 33923

[21] Appl. No.: 09/209,114

[22] Filed: Dec. 10, 1998

Related U.S. Application Data

[60] Provisional application No. 60/108,188, Nov. 12, 1998.

[51] Int. Cl.$^{6}$ .......... A44B 21/00

[52] U.S. Cl. .......... 24/295; 24/289; 24/293; 24/458

[58] Field of Search .......... 24/295, 293, 289, 24/297, 458

[56] References Cited

U.S. PATENT DOCUMENTS

| | | | |
|---|---|---|---|
| 2,322,656 | 6/1943 | Murphy | 24/73 |
| 2,329,688 | 9/1943 | Bedford | 189/88 |
| 2,542,883 | 2/1951 | Tinnerman | 24/295 |
| 2,607,971 | 8/1952 | Bedford | 24/73 |
| 2,825,948 | 3/1958 | Parkin | 24/73 |
| 3,525,129 | 8/1970 | Holton | 24/295 |
| 3,673,643 | 7/1972 | Kindell | 24/73 B |
| 3,864,789 | 2/1975 | Leitner | 24/73 MF |
| 4,609,170 | 9/1986 | Schnabl | 248/71 |
| 4,683,622 | 8/1987 | Oehlke | 24/295 |
| 5,095,592 | 3/1992 | Doerfling | 24/293 |
| 5,373,611 | 12/1994 | Murata | 24/297 |
| 5,422,789 | 6/1995 | Fisher et al. | 361/719 |
| 5,542,158 | 8/1996 | Gronau et al. | 24/295 |
| 5,887,319 | 3/1999 | Smith | 24/293 |

FOREIGN PATENT DOCUMENTS

| | | | |
|---|---|---|---|
| 0496700 | 10/1953 | Canada | 24/295 |

OTHER PUBLICATIONS

Attachment 1 shows an item which was being sold more than one year before the date (Nov. 12, 1998) that the provisional application 60/108168 was filed. The present application claims priority of the provisional application 60/108168.

*Primary Examiner*—Victor N. Sakran
*Attorney, Agent, or Firm*—E. Vassiliou

[57] ABSTRACT

A spring fastener for securing one or more sheets of material on another sheet of material having a first clip with inwardly extended barbs, and a second clip having two sides. One of the sides has a wide angle bent, while the other side has one or more embosses and/or recesses. The fastener also comprises a resilient elastic body extending from the vicinity of the base of the first clip to at least one of the embosses. Examples of resilient bodies are foamed or unfoamed plastisol or polyurethane. The substantially central part of the resilient body is effectively reinforced and held in position by a sealing promoter extending preferably from the vicinity of the base of the first clip toward a middle position between the first and the second sides of the second clip, thus providing to the fastener superior sealing performance.

27 Claims, 2 Drawing Sheets

SPRING FASTENER OF HIGH SEALING PERFORMANCE

CROSS-REFERENCE TO RELATED APPLICATION

This application claims priority from U.S. Provisional Application Ser. No. 60/108188, filed Nov. 12, 1998, which application is incorporated herein by reference in its entirety.

FIELD OF THE INVENTION

This invention relates to spring fasteners, and more particularly to those fasteners characterized by self-sealing properties and reversible quick-lock mechanisms.

BACKGROUND OF THE INVENTION

A number of fasteners have been used in the past for securing one object on another object, as for example, securing an article such as for example a plastic sheet on a metal or other rigid plastic sheet. However, the fasteners being used presently are particularly designed for only a limited number of matching objects to be secured on each other. For sealing purposes, a secondary resilient sheet, or a resilient body attached to the fastener may be used.

Examples of conventional fasteners are disclosed in U.S. Pat. No. 5,542,158 (Gronau et al.); U.S. Pat. No. 5,422,789 (Fisher et al.), U.S. Pat. No. 5,373,611 (Murata); U.S. Pat. No. 4,609,170 (Schnabl); U.S. Pat. No. 3,864,789 (Leitner); U.S. Pat. No. 3,673,643 (Kindell); U.S. Pat. No. 2,825,948 (Parkin); U.S. Pat. No. 2,607,971 (Bedford, Jr.); U.S. Pat. No. 2,329,688 (Bedford, Jr.); U.S. Pat. No. 2,322,656 (Murphy), among others.

My co-pending application Ser. No. 08/943,879, filed Oct. 3, 1997, and the Provisional Application Ser. No. 60/028,089, filed Oct. 7, 1996 describe self adjusting spring fasteners, and they are both incorporated herein by reference. These fasteners may be used by themselves, or with a resilient sheet over the rigid sheet, or with a resilient body attached to the fastener.

SUMMARY OF THE INVENTION

The instant invention is directed to spring fasteners characterized by quick and variable lock mechanisms, as well as by highly improved sealing characteristics. More particularly, the instant invention pertains a fastening device comprising a rigid body, which rigid body comprises in combination an assembly of a first clip and a second clip, the first clip having a base, the second clip having a first side and a second side, the base of the first clip integrally connected to the first side of the second clip, the first side of the second clip having a wide angle bent, the second side of the second clip having one or more embosses and/or recesses, the emboss(es) and/or recess(es) being parallel to the wide angle bent, the emboss(es) and/or recess(es) being engageable to an opening of a rigid sheet, and securing the fastening device on the rigid sheet by an emboss and/or a recess, or by the wide angle bent, or a combination thereof, thus allowing the fastening device to be engageable to the opening in a plurality of positions, the fastening device also comprising a resilient body extending in thickness from the vicinity of the base to at least one emboss and/or recess, which emboss and/or recess is located closest to the base, and a sealing promoter, extending from the rigid body toward a middle position between the first side and the second side of the second clip, the sealing promoter being at least partially embedded within the resilient body.

Preferably the sealing promoter extents from the first side of the second clip, and even more preferably from a part of the rigid body in the vicinity of the base of the first clip. Also, preferably, the sealing promoter is substantially embedded in its totality within the resilient body.

Preferably, the resilient body extends in thickness far enough to cover all embosses and/or recesses.

The resilient body is preferably molded in place, and more preferably comprises a foamed or unfoamed polymer selected from a group consisting of plastisol, polyurethane, and a combination thereof.

The present invention also relates to a car having a first element supported to a second element by a fastening device comprising a rigid body, which rigid body comprises in combination an assembly of a first clip and a second clip, the first clip having a base, the second clip having a first side and a second side, the base of the first clip integrally connected to the first side of the second clip, the first side of the second clip having a wide angle bent, the second side of the second clip having one or more embosses and/or recesses, the emboss(es) and/or recess(es) being parallel to the wide angle bent, the emboss(es) and/or recess(es) being engageable to an opening of a rigid sheet, and securing the fastening device on the rigid sheet by an emboss and/or a recess, or by the wide angle bent, or a combination thereof, thus allowing the fastening device to be engageable to the opening in a plurality of positions, the fastening device also comprising a resilient body extending in thickness from the vicinity of the base to at least one emboss and/or recess, which emboss and/or recess is located closest to the base, and a sealing promoter, extending from the rigid body toward a middle position between the first side and the second side of the second clip, the sealing promoter being at least partially embedded within the resilient body.

As aforementioned, preferably, the sealing promoter extents from the first side of the second clip, and even more preferably from a part of the rigid body in the vicinity of the base of the first clip. Also, preferably, the sealing promoter is substantially embedded in its totality within the resilient body.

As also aforementioned, the resilient body preferably extends in thickness far enough to cover all embosses and/or recesses.

DESCRIPTION OF THE DRAWING

The reader's understanding of practical implementation of preferred embodiments of the invention will be enhanced by reference to the following detailed description taken in conjunction with perusal of the drawing figures, wherein.

DETAILED DESCRIPTION OF THE INVENTION

Figure 1:
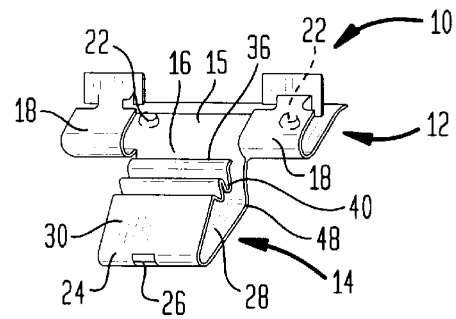
FIG. 1 shows a perspective view of a spring fastener (without the resilient body, for purposes of clarity) according to a highly preferred embodiment of the present invention.
Figure 2:
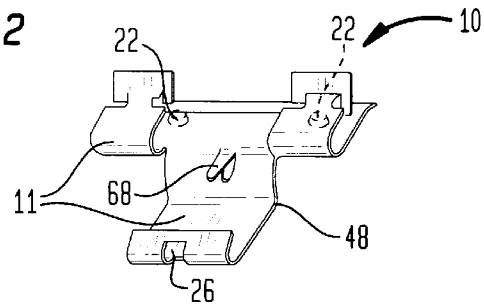
FIG. 2 is a fragmental perspective view of the spring fastener (without the resilient body, for purposes of clarity) of FIG. 1, showing the sealing promoter.
Figure 3:
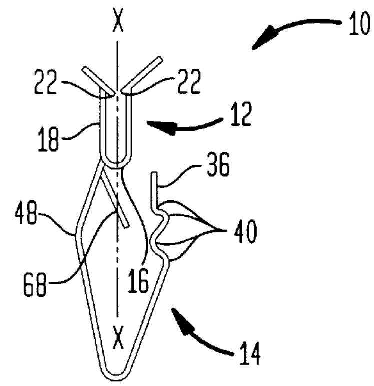
FIG. 3 shows a side view of the spring fastener of FIGS. 1 and 2.
Figure 4:
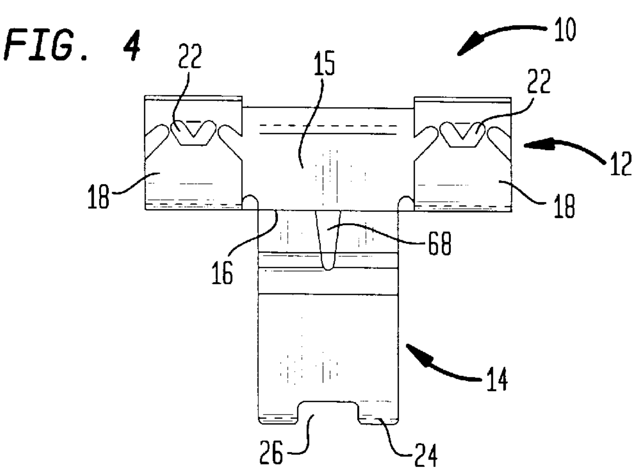
FIG. 4 shows a front view of the spring fastener of FIG. 3.

The instant invention is directed to spring fasteners or fastening devices for securing one or more sheets of material usually including resilient and rigid sheets. The fasteners of this invention are characterized by high tolerance regarding thickness variations and number of sheets to be fastened together. Further, they provide outstanding sealing performance, due to a novel sealing promoter, disposed within the structure of the fastener, as it will be seen in the detailed description at later point.

Referring now to FIGS. 1–6, there is depicted a fastening device 10 according to a preferred embodiment of the instant invention. The fastening device 10 comprises a rigid body 11, which in turn comprises a first clip 12 and a second clip 14. The first clip has a flat portion 15, a base 16, and two clip members 18. Each clip member 18 comprises inwardly barbs 22. The flat portion 15 of the first clip 12 is integrally connected to the second clip 14 at the base 16 of the first clip 12. The rigid body 11 represents the totality of the fastening device 10, with the exception of the resilient body 66 (see FIGS. 5, 6, and 7), and the sealing promoter 68 (see FIG. 2) which are not parts of the rigid body.

The second clip 14 has a substantially V-shaped structure, which structure has a bottom 24, an optional opening 26 at the bottom 24, a first side 28, and a second side 30. The opening 26 is useful for modifying the springiness between the two sides, and for other purposes.

The first side 28 of the second clip 14 is integrally connected to the base 16 of the first clip 12. The second 30 is integrally connected to the first side 28 in a spring relation at the bottom of the V-shaped structure, and it is free (unconnected) at the upper-half portion 36. The second side 30 has one or more embosses and/or one or more recesses 40, preferably at its upper portion 36.

It is preferable that the first side 28 has a wide angle bent 48 in the upper-half portion 36.

Figure 5:
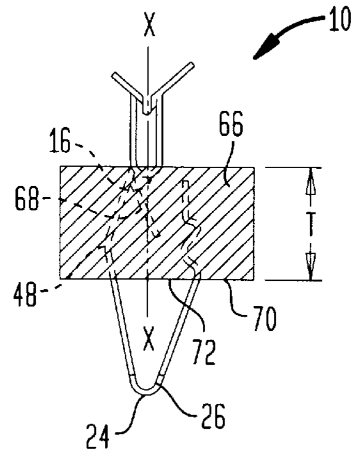
FIG. 5 shows a side view of the spring fastener of FIGS. 1–4 with the resilient body.
Figure 6:
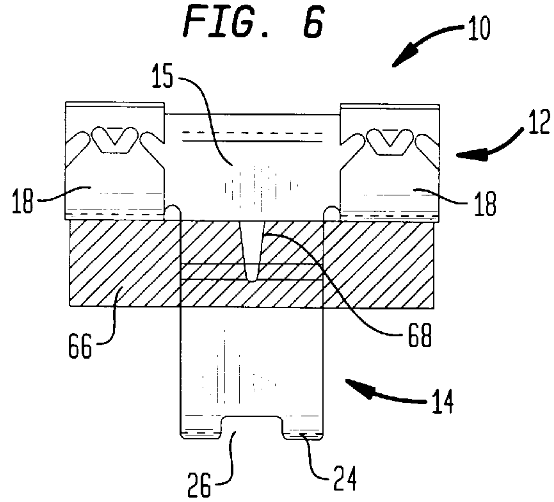
FIG. 6 shows a front view of the spring fastener of FIG. 5 with the resilient body.

The fastener of this invention, also comprises a resilient body or block 66 attached to the fastener, preferably by molding. The resilient body preferably comprises a foamed or unfoamed plastisol or polyurethane. Foamed plastisol is most preferable. The resilient body 66 has a thickness T, which preferably extends from the vicinity of the base 16 to a point covering at least one emboss or recess, and preferably all embosses and recesses as shown in FIGS. 5 and 6.

It is absolutely critical for the purposes of this invention that the fastener 10 comprises also a sealing promoter 68, which extends preferably from the first side of the second clip, and more preferably from the vicinity of the base 16 of the first clip 12 toward a middle position X—X between the first side 28 and the second side 30 of the second clip 14. The sealing promoter 68 should be at least partially embedded in the resilient body 66. Preferably, it should be substantially fully embedded within the resilient body 66. However, for the purposes of this invention, the sealing promoter 68 may be extended from any part of the rigid body 11 toward the middle position X—X between the first side 28 and the second side 30 of the second clip 14, as long as it is at least partially embedded in the portion of the resilient body between the first side 28 and the second side 30 of the second clip 14, or as long as it helps said portion of the resilient body in resisting deformation during operation.

Although the sealing promoter is shown in the miscellaneous Figures to extend from the vicinity of the base 16 of the first clip 12 toward a middle position X—X between the first side 28 and the second side 30 of the second clip 14 (which is the most preferred embodiment of the instant invention), the sealing promoter may extend from other parts of the rigid body. This is very easily understood by a person of ordinary skill in the art.

Figure 7:
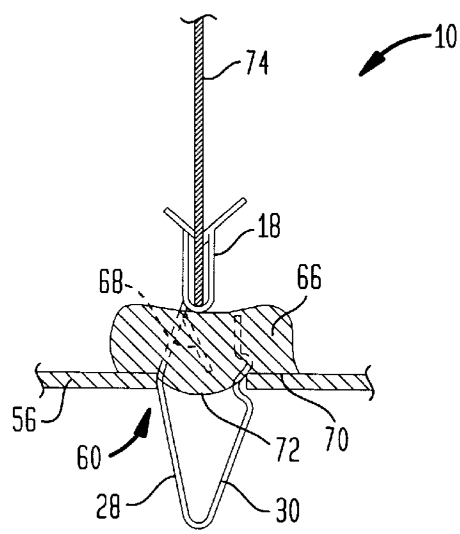
FIG. 7 shows a side view of the spring fastener of FIG. 5 inserted into an opening of a rigid sheet.

The operation of this embodiment is illustrated in FIG. 7, which depicts a rigid panel, such as for example a steel panel 56, having a slot 60. The fastener shown in FIGS. 5 and 6 is inserted by the operator into the slot 60 far enough to provide a snuggle fit. The bottom part 70 around the slot 60, and outside the sides 28 and 30 of the second clip 14, is necessarily raised in order to allow the engagement of the fastener 10 within the opening 60. The bottom part 72 of the resilient body within the two sides 28 and 30 is stabilized and forced to stay substantially in its initial position (before the insertion of the fastener 10 into the opening 60), thus preventing possible partial delamination of the resilient body from the rest of the fastener, and also providing substantial force pushing the resilient body in a direction toward the steel panel, not only directly within, but also indirectly outside the two sides 28 and 30, thus resulting in highly improved scaling performance when compared to a similar fastener lacking the scaling promoter 68. After, or even before, this operation, the operator may insert an additional panel into the clip members 18 of the first clip 12.

According to this invention, in addition to highly improved sealing performance provided regarding both liquid and gas leakage between the two sides of a panel, such as panel 56 for example, squeaking and other similar noises, very common to vehicles are substantially prevented.

Cars or other vehicles may be made, comprising one or more of the fasteners of the instant invention, providing substantial improvements regarding safety, performance and comfort.

Examples of embodiments demonstrating the operation of the instant invention, have now been given for illustration purposes only, and should not be construed as restricting the scope or limits of this invention in any way.

What is claimed is:

1. A fastening device comprising a rigid body, which rigid body comprises in combination an assembly of a first clip and a second clip, the first clip having a base, the second clip having a first side and a second side, the base of the first clip integrally connected to the first side of the second clip, the first side of the second clip having a wide angle bent, the second side of the second clip having a structural component selected from a group consisting of emboss, recess, and a combination thereof, said structural component being parallel to the wide angle bent, and engageable to an opening of a rigid sheet, thus securing the fastening device on the rigid sheet, and allowing the fastening device to be engageable to the opening in a plurality of positions, the fastening device also comprising a resilient body extending in thickness from the vicinity of the base to at least one structural component, which structural component is located closest to the base, and a sealing promoter, extending from the rigid body toward a middle position between the first side and the second side of the second clip, the sealing promoter being at least partially embedded within the resilient body, the sealing promoter causing deformation of the resilient body between the central part and the rest of said resilient body when the fastening device is engaged to the rigid sheet, thereby improving the sealing performance of the fastening device.

2. A fastening device as defined in claim 1, wherein the sealing promoter extents from the first side of the second clip toward the middle position between the first side and the second side of the second clip.

3. A fastening device as defined in claim 2, wherein the sealing promoter is substantially fully embedded within the resilient body.

4. A fastening device as defined in claim 3, wherein the resilient body comprises a polymer selected from a group consisting of plastisol, polyurethane, and a combination thereof.

5. A fastening device as defined in claim 2, wherein the resilient body is molded in place.

6. A fastening device as defined in claim 2 wherein the resilient body comprises a polymer selected from a group consisting of plastisol, polyurethane, and a combination thereof.

7. A fastening device as defined in claim 1, wherein the sealing promoter extents from a part of the rigid body in the vicinity of the base of the first clip toward the middle position between the first side and the second side of the second clip.

8. A fastening device as defined in claim 7, wherein the sealing promoter is substantially fully embedded within the resilient body.

9. A fastening device as defined in claim 8, wherein the resilient body comprises a polymer selected from a group consisting of plastisol, polyurethane, and a combination thereof.

10. A fastening device as defined in claim 7, wherein the resilient body is molded in place.

11. A fastening device as defined in claim 10 wherein the resilient body comprises a polymer selected from a group consisting of plastisol, polyurethane, and a combination thereof.

12. A fastening device as defined in claim 7, wherein the resilient body comprises a polymer selected from a group consisting of plastisol, polyurethane, and a combination thereof.

13. A fastening device as defined in claim 1, wherein the sealing promoter is substantially fully embedded within the resilient body.

14. A fastening device as defined in claim 13, wherein the resilient body is molded in place.

15. A fastening device as defined in claim 14, wherein the resilient body comprises a polymer selected from a group consisting of plastisol, polyurethane, and a combination thereof.

16. A fastening device as defined in claim 13, wherein the resilient body comprises a polymer selected from a group consisting of plastisol, polyurethane, and a combination thereof.

17. A fastening device as defined in claim 1, wherein the resilient body is molded in place.

18. A fastening device as defined in claim 17, wherein the resilient body comprises a polymer selected from a group consisting of plastisol, polyurethane, and a combination thereof.

19. A fastening device as defined in claim 5, wherein the resilient body comprises a polymer selected from a group consisting of plastisol, polyurethane, and a combination thereof.

20. A fastening device as defined in claim 1, wherein the resilient body extends in thickness far enough to cover all structural components.

21. A fastening device as defined in claim 1, wherein the resilient body comprises a polymer selected from a group consisting of plastisol, polyurethane, and a combination thereof.

22. A fastening device as defined in claim 20, wherein the resilient body comprises a polymer selected from a group consisting of plastisol, polyurethane, and a combination thereof.

23. A car having a first element supported to a second element by a fastening device comprising a rigid body, which rigid body comprises in combination an assembly of a first clip and a second clip, the first clip having a base, the second clip having a first side and a second side, the base of the first clip integrally connected to the first side of the second clip, the first side of the second clip having a wide angle bent, the second side of the second clip having a structural component selected from a group consisting of emboss, recess, and a combination thereof, said structural component being parallel to the wide angle bent, and engageable to an opening of a rigid sheet, thus securing the fastening device on the rigid sheet, and allowing the fastening device to be engageable to the opening in a plurality of positions, the fastening device also comprising a resilient body extending in thickness from the vicinity of the base to at least one structural component, which structural component is located closest to the base, and a sealing promoter, extending from the rigid body toward a middle position between the first side and the second side of the second clip, the sealing promoter being at least partially embedded within the resilient body, the sealing promoter causing deformation of the resilient body between the central part and the rest of said resilient body when the fastening device is engaged to the rigid sheet, thereby improving the sealing performance of the fastening device.

24. A car as defined in claim 23, wherein the sealing promoter extents from a part of the rigid body in the vicinity of the base of the first clip toward the middle position between the first side and the second side of the second clip.

25. A car as defined in claim 24, wherein the sealing promoter is substantially fully embedded within the resilient body.

26. A car as defined in claim 23, wherein the sealing promoter extents from the first side of the second clip toward the middle position between the first side and the second side of the second clip.

27. A car as defined in claim 26, wherein the sealing promoter is substantially fully embedded within the resilient body.

* * * * *